US008909915B2

(12) United States Patent  (10) Patent No.: US 8,909,915 B2
Ferren                     (45) Date of Patent:     Dec. 9, 2014

(54) MULTI-MODE HANDHELD WIRELESS DEVICE WITH SHARED MODE TO SUPPORT CROSS-MODE COMMUNICATIONS

(75) Inventor: Bran Ferren, Beverly Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/376,618

(22) PCT Filed: Dec. 31, 2009

(86) PCT No.: PCT/US2009/069927
§ 371 (c)(1),
(2), (4) Date: Dec. 7, 2011

(87) PCT Pub. No.: WO2010/147610
PCT Pub. Date: Dec. 23, 2010

(65) Prior Publication Data
US 2012/0079265 A1     Mar. 29, 2012

Related U.S. Application Data

(60) Provisional application No. 61/187,520, filed on Jun. 16, 2009.

(51) Int. Cl.
*G06F 1/00*       (2006.01)
*G06F 21/32*      (2013.01)
(Continued)

(52) U.S. Cl.
CPC .............. *G02B 13/009* (2013.01); *G06F 21/32* (2013.01); *H04M 2250/52* (2013.01); *G06K 2207/1011* (2013.01); *H04N 5/232* (2013.01); *G06F 3/0488* (2013.01); *G02B 13/0065* (2013.01); *G06Q 30/02* (2013.01); *G06F 9/4443* (2013.01); *H04N 5/23296* (2013.01); *G06F 3/04886* (2013.01); *H04N 13/0239* (2013.01); *G06F 3/0418* (2013.01); *G06F 3/04883* (2013.01); *H04M 1/72563* (2013.01); *G06F 3/04842* (2013.01); *G03B 3/00* (2013.01); *G06K 7/10811* (2013.01); *H04N 13/0242* (2013.01)
USPC ........ 713/100; 455/435.1; 707/694; 707/770; 718/1

(58) Field of Classification Search
USPC .............. 726/28; 455/435.1, 420, 567, 414.1, 455/566, 415, 419; 713/201; 701/207; 370/339; 707/694, 770; 345/173, 415; 715/854; 379/201; 718/1; 710/11
See application file for complete search history.

(56) References Cited

U.S. PATENT DOCUMENTS 5,533,183 A * 7/1996 Henderson et al. ........... 715/854
6,195,571 B1   2/2001 Osuge
(Continued)

FOREIGN PATENT DOCUMENTS

CN       101030100       9/2007
EP        1217792        6/2002
(Continued)

OTHER PUBLICATIONS

International Search Report and Written Opinion received for PCT Patent Application No. PCT/US2009/069927, mailed on Jul. 29, 2010, 9 pages.
(Continued)

*Primary Examiner* — Thomas Lee
*Assistant Examiner* — Aurel Prifti
(74) *Attorney, Agent, or Firm* — Blakely, Sokoloff, Taylor & Zafman LLP (57) ABSTRACT

Various embodiments of the invention relate to a multi-function handheld user device that may have multiple selectable modes of operation for different areas of the user's life, each mode with its own database, applications, preferences, operational restrictions, and access limitations. Various mechanisms may be provided for switching between modes. Within each mode, context awareness and situational awareness may be used to obtain additional information or perform additional functions not directly requested by the user.

30 Claims, 8 Drawing Sheets

(51) Int. Cl.

| | | |
|---|---|---|
| H04N 5/232 | (2006.01) | |
| G06F 3/0488 | (2013.01) | |
| G02B 13/00 | (2006.01) | |
| G06Q 30/02 | (2012.01) | |
| G06F 9/44 | (2006.01) | |
| H04N 13/02 | (2006.01) | |
| G06F 3/041 | (2006.01) | |
| G06F 3/0484 | (2013.01) | |
| G03B 3/00 | (2006.01) | |
| G06K 7/10 | (2006.01) | |
| H04M 1/725 | (2006.01) | |

(56) References Cited

U.S. PATENT DOCUMENTS

| | | | |
|---|---|---|---|
| 6,272,545 B1 | 8/2001 | Flanagin et al. | |
| 6,282,508 B1 | 8/2001 | Kimura et al. | |
| 6,530,083 B1 | 3/2003 | Liebenow | |
| 6,633,274 B1 | 10/2003 | Yokota et al. | |
| 6,753,842 B1 | 6/2004 | Williams et al. | |
| 7,123,247 B2 | 10/2006 | Morita | |
| 7,190,338 B2 | 3/2007 | Kubota et al. | |
| 7,238,024 B2* | 7/2007 | Rehbein et al. | 434/157 |
| 7,239,742 B2 | 7/2007 | Ohtani et al. | |
| 7,424,674 B1 | 9/2008 | Gross et al. | |
| 7,532,196 B2* | 5/2009 | Hinckley | 345/156 |
| 7,581,180 B2 | 8/2009 | Masui et al. | |
| 7,782,333 B2 | 8/2010 | Yamaguchi et al. | |
| 7,787,870 B2* | 8/2010 | Burgan et al. | 455/415 |
| 7,805,415 B1* | 9/2010 | Flesher et al. | 707/694 |
| 7,958,142 B2* | 6/2011 | Li et al. | 707/770 |
| 2002/0040442 A1 | 4/2002 | Ishidera | |
| 2002/0119788 A1 | 8/2002 | Parupudi et al. | |
| 2002/0173295 A1 | 11/2002 | Nykanen et al. | |
| 2002/0180723 A1 | 12/2002 | Siwinski | |
| 2003/0126330 A1 | 7/2003 | Balasuriya | |
| 2003/0200481 A1 | 10/2003 | Stanley | |
| 2004/0039909 A1 | 2/2004 | Cheng | |
| 2004/0066932 A1 | 4/2004 | Seligmann | |
| 2004/0203768 A1* | 10/2004 | Ylitalo et al. | 455/435.1 |
| 2004/0257316 A1 | 12/2004 | Nguyen | |
| 2005/0044423 A1* | 2/2005 | Mellmer et al. | 713/201 |
| 2005/0110717 A1 | 5/2005 | Iwamura | |
| 2005/0124389 A1 | 6/2005 | Yang | |
| 2005/0228621 A1 | 10/2005 | Matsuo et al. | |
| 2005/0276407 A1 | 12/2005 | Mohler | |
| 2005/0283724 A1 | 12/2005 | Griffin | |
| 2006/0072726 A1* | 4/2006 | Klein et al. | 379/201.01 |
| 2006/0123081 A1 | 6/2006 | Baudino et al. | |
| 2006/0132474 A1 | 6/2006 | Lam | |
| 2006/0197753 A1 | 9/2006 | Hotelling | |
| 2006/0206733 A1 | 9/2006 | Ono | |
| 2006/0236144 A1 | 10/2006 | Chao | |
| 2006/0258408 A1 | 11/2006 | Tuomela et al. | |
| 2006/0267972 A1 | 11/2006 | Yi | |
| 2007/0004393 A1* | 1/2007 | Forsberg et al. | 455/420 |
| 2007/0021108 A1* | 1/2007 | Bocking et al. | 455/414.1 |
| 2007/0037605 A1 | 2/2007 | Logan | |
| 2007/0082712 A1* | 4/2007 | Ikeda et al. | 455/567 |
| 2007/0226649 A1 | 9/2007 | Agmon | |
| 2007/0129196 A1 | 11/2007 | Nurmela et al. | |
| 2007/0300077 A1 | 12/2007 | Mani et al. | |
| 2008/0055318 A1 | 3/2008 | Glen | |
| 2008/0088602 A1* | 4/2008 | Hotelling | 345/173 |
| 2008/0165022 A1 | 7/2008 | Herz et al. | |
| 2008/0220715 A1 | 9/2008 | Sinha et al. | |
| 2008/0225014 A1 | 9/2008 | Kim | |
| 2008/0240387 A1 | 10/2008 | Murai | |
| 2008/0243808 A1 | 10/2008 | Rieman et al. | |
| 2008/0253345 A1* | 10/2008 | Sanguinetti | 370/339 |
| 2008/0261593 A1* | 10/2008 | Wong et al. | 455/435.1 |
| 2008/0288955 A1 | 11/2008 | Brockway et al. | |
| 2009/0019131 A1 | 1/2009 | Ganesan | |
| 2009/0036111 A1* | 2/2009 | Danford et al. | 455/419 |
| 2009/0037909 A1* | 2/2009 | Xu | 718/1 |
| 2009/0061950 A1* | 3/2009 | Kamachi et al. | 455/566 |
| 2009/0070030 A1* | 3/2009 | Isoda et al. | 701/207 |
| 2009/0070606 A1 | 3/2009 | Chen et al. | |
| 2009/0125902 A1* | 5/2009 | Ghosh et al. | 718/1 |
| 2009/0163226 A1 | 6/2009 | Karkaria et al. | |
| 2009/0165145 A1* | 6/2009 | Haapsaari et al. | 726/28 |
| 2009/0286557 A1 | 11/2009 | Clipsham | |
| 2009/0322800 A1 | 12/2009 | Atkins | |
| 2010/0062788 A1 | 3/2010 | Nagorniak | |
| 2010/0211698 A1* | 8/2010 | Krishnaswamy | 710/11 |
| 2010/0277512 A1 | 11/2010 | Shen et al. | |
| 2010/0298048 A1 | 11/2010 | Yamazaki | |
| 2010/0318903 A1 | 12/2010 | Ferren | |
| 2011/0074765 A1 | 3/2011 | Oterhals et al. | |
| 2011/0080419 A1 | 4/2011 | Croxford et al. | |
| 2011/0098089 A1* | 4/2011 | Irie et al. | 455/566 |

FOREIGN PATENT DOCUMENTS

| | | |
|---|---|---|
| EP | 1204262 | 3/2004 |
| EP | 1445923 | 8/2004 |
| EP | 1737193 | 12/2006 |
| EP | 1903759 | 3/2008 |
| EP | 2076001 | 7/2009 |
| GB | 2373914 | 10/2002 |
| GB | 2397196 | 7/2004 |
| GB | 2421147 | 6/2006 |
| JP | 2000033080 | 2/2000 |
| JP | 2003237262 | 8/2003 |
| JP | 2003-284138 | 10/2003 |
| JP | 2005-284418 | 10/2005 |
| JP | 2006-236159 | 9/2006 |
| JP | 2007-135006 | 5/2007 |
| JP | 2007-219835 | 8/2007 |
| JP | 2007-300648 | 11/2007 |
| JP | 2008-193546 | 8/2008 |
| JP | 2009-49564 | 3/2009 |
| JP | 2009-088917 | 4/2009 |
| JP | 2010011334 | 1/2010 |
| JP | 2010107784 | 5/2010 |
| KR | 10-2005-0065198 | 6/2005 |
| KR | 10-2005-0073849 | 7/2005 |
| KR | 20070062599 | 6/2007 |
| KR | 10-2008-0084208 | 9/2008 |
| KR | 10-2009-003861 | 4/2009 |
| WO | WO-2005/101239 | 10/2005 |
| WO | WO-2007038281 | 4/2007 |
| WO | WO-2008067261 | 6/2008 |
| WO | WO-2009-030556 | 3/2009 |
| WO | WO2010/133770 | 11/2010 |
| WO | 2010147610 A1 | 12/2010 |

OTHER PUBLICATIONS

Non-final Office Action for United Kingdom Patent Application No. GB1009708.7 mailed Aug. 25, 2010.

Non-final Office Action for United Kingdom Patent Application No. GB1009714.5 mailed Aug. 18, 2010.

Combined Search Report and Examination Report for United Kingdom Patent Application 1009711.1 issued Sep. 23, 2010 Mailed Oct. 22, 2010, 10 pages.

First Office Action for German Patent Application No. 10 2010 023 692.6-31 mailed Mar. 18, 2011.

Non-Final Office Action for U.S. Appl. No. 12/646,837, Mailed Jun. 6, 2011, 12 pages.

Notice of Preliminary Rejection for Korean Patent Application No. 10-2010-57105, Mailed Jun. 23, 2011, 5 pages.

Non-Final Office Action for U.S. Appl. No. 12/646,658, Mailed Aug. 23, 2011, 16 pages.

Non-Final Office Action for U.S. Appl. No. 11/020,397, Mailed Sep. 11, 2007, 12 pages.

Final Office Action for U.S. Appl. No. 11/020,397, Mailed Jun. 30, 2008, 13 pages.

Non-final Office Action for United Kingdom Patent Application No. GB1009714.5 mailed Oct. 18, 2011.

First Office Action for German Patent Application No. 10 2010 023 691.8-31 C mailed Dec. 2, 2011.

(56) References Cited

OTHER PUBLICATIONS

Office Action from UK1009708.7 mailed Jan. 9, 2012, 2 pages.
European Search Report and Opinion mailed Mar. 23, 2012, in European Patent Application No. EP11192611, 5 pages.
European Search Report and Opinion mailed May 8, 2012, in European Patent Application No. 11192654.9, 6 pages.
Combined search and examination report mailed May 2, 2012, in Great Britain Patent Application No. GB1009714.5, 3 pages.
Office Action mailed Jun. 6, 2012, in U.S. Appl. No. 12/646,730, 20 pages.
First Official Action mailed Apr. 10, 2012 (+ English translation), in Japanese Patent Application No. 2010-135660, 6 pages.
Office Action mailed May 22, 2012 (+ English Translation), in Japanese Patent Application No. 2010-135662, 6 pages.
"English translation of preliminary rejection mailed Jun. 19, 2012, in Korean Patent Application No. 10-2011-7028358, 2 pages".
"English translation of preliminary rejection mailed Jun. 20, 2012, in Korean Patent Application No. 10-2011-7028359, 2 pages".
"International Search and Written Opinion of the International Searching Authority in PCT/US2010/027946, dated Feb. 1, 2011, 9 pages".
"Invitation pursuant to Rule 63(1) EPC, dated Jul. 2, 2012, in European Divisional Patent Application No. 11192657.2, 3 pages".
"Office Action mailed Jul. 20, 2012, in U.S. Appl. No. 13/376,624, 18 pages".
Hakkila, J., et al., "Collaboration in Context-Aware Mobile Phone Applications," *Proceedings of the 38th Hawaii International Conference on System Sciences—2005*, Jan. 3, 2005, XP010762309.
Juergen, Carstens, "Use of context awareness to modify the mobile phone behavior/profile," *IP.com Journal*, IP.com Inc., West Henrietta, NY, Jan. 25, 2005, XP013022467, ISSN: 1533-001.
Kiyohara, R., et al., "Context-Aware Middle are for Mobile Phone Based on Operational Logs," Consumer Electronics, 2008. ICCE 2008. *Digest of Technical Papers*. International Conference on, IEEE, Piscataway, NJ, Jan. 9, 2008, pp. 1-2.
Extended European Search Report and Opinion completed Jan. 8, 2014, in European Patent Application No. 09846309.4, 7 pages.
William Enck et al., "Understanding Android Security," IEEE Security & Privacy, IEEE Service Center, Los Alamitos, CA, US, vol. 7, No. 1, Jan. 1, 2009, pp. 50-57, XP011243114, ISSN: 1540-7993, DOI: 10.1109/MSP.2009.26.
First Office Action dated Nov. 4, 2013 (+ English translation), in Chinese Patent Application No. 200980159113.3, 16 pages.
Notice of Reasons for Rejection dated Aug. 13, 2013 (+ English translation), in Japanese Patent Application No. 2012-511804, 4 pages.
Notice of Preliminary Rejection dated Dec. 18, 2012 (+ English translation), in Korean Patent Application No. 10-2011-7026278, 9 pages.
Office Action dated Jul. 15, 2014 (+ English translation), in Chinese Patent Application No. 200980159113.3, 15 pages.

\* cited by examiner

| WORK | FAMILY | PERSONAL |
|---|---|---|
| DATABASE 1<br>APPLICATIONS 1<br>RESTRICTIONS 1<br>CONTACTS 1<br>ACCESS LIMITATIONS 1<br>PREFERENCES 1 | DATABASE 2<br>APPLICATIONS 2<br>RESTRICTIONS 2<br>CONTACTS 2<br>ACCESS LIMITATIONS 2<br>PREFERENCES 2 | DATABASE 3<br>APPLICATIONS 3<br>RESTRICTIONS 3<br>CONTACTS 3<br>ACCESS LIMITATIONS 3<br>PREFERENCES 3 |

MULTI-MODE HANDHELD WIRELESS DEVICE WITH SHARED MODE TO SUPPORT CROSS-MODE COMMUNICATIONS

RELATED APPLICATIONS

This application is related to and claims priority to U.S. Provisional Patent Application No. 61/187,520 filed Jun. 16, 2009, and International Application PCT/US2009/069927, and such applications are incorporated herein by reference.

BACKGROUND

As the wireless industry grows, different types of handheld devices, with different capabilities, are used for different purposes. Cell phones allow verbal communication and texting, personal data assistants allow the user to organize his/her schedule and access email, music players provide for portable music enjoyment, netbook computers enable full internet access, etc. Although some consolidation has occurred, the typical user must still carry around multiple devices to satisfy his/her needs. Further, none of these devices is context aware—that is, the device cannot adapt to the user's environment because the device is not aware of that environment. In addition, a user may wish to use the same device in different areas of his/her life (i.e., work, personal, family, travel, etc.), with different requirements in each for things such as security levels, available functionality, contact information, etc. Again, current devices cannot satisfy this demand because they cannot distinguish between the different areas of the user's life.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

Many people engage in a variety of activities that tend to form into natural clusters. For example, a professional's life may be clustered around work, family, and personal activities. A teenager's life may be clustered around school, family, and friends. A retiree's life may be clustered around finance, family, and health. Each cluster of activities may have its own rules, behaviors, constraints, and priorities that are somewhat different than in the other clusters. People who use a single device in all areas of their life typically discover that the different areas of their life intrude into each other, with consequences that have the potential to be socially embarrassing and even legally damaging. As technology becomes an increasingly important tool in keeping up with our daily activities, it becomes increasing desirable that this tool adapt itself to these different areas of a person's life, so as to avoid or at least reduce these consequences.

For example, a device may operate in a different 'mode' for each such area of a person's life. While a device may accommodate any feasible number of such modes, coinciding with an equal number of areas of the user's life, too few modes may provide insufficient flexibility, and too many modes may be too much for the average person to keep up with. Three modes is used here as an example of an optimal number of modes for many people, but the inventive concepts may be applied to two, four, or more modes without departing from the basic principles described.

To illustrate these clusters of activities, take a look at the three possible areas of a professional's life: work, family, and personal. The work mode encompasses time at the office or other places of work, and may revolve around business email and phone calls, documents, expense reports, meetings, business contacts, etc. Some of these activities may involve sensitive business information and therefore require a level of security that isn't needed in the other areas. The family mode may pertain to a spouse, children, other relatives, neighbors, and the children's teachers. It may involve emails and phone calls related to these people, and to school meetings, vacation schedules, social networking sites, home maintenance, and related financial obligations. The personal mode may pertain to individual interests such as hobbies and entertainment, and may be clustered around circles of friends based on common interest profiles.

In each of these areas of life, people have different desires and needs and face different constraints. For example, people at work demand a different level of technical support than people at home, and the rules of good behavior constraining people at work are significantly more restrictive than those constraining their play activities. The consequences of error also differ; for example it might be critical to apply filters preventing the inadvertent use of certain expressions at school or work, but less critical when interacting with friends. In a similar manner, the style of communicating in business may need to be more formal than when communicating with friends. Similarly, it may be important not to inadvertently send a family email to a business contact, or send a confidential business email to a relative. By separating the operation of the device into distinct modes, these types of problems can be automatically prevented.

The use of separate modes corresponding to separate areas of the user's life may allow the device to better interpret (and provide recommendations for) the user's actions, It may also permit the device to apply different rules regarding access, authentication, and content standards in each mode. Financial data may be kept separate between the modes.

The operations of the device may be different depending on which mode it is in. This difference may be implemented by accessing different databases, by running different applications, and by applying different constraints to its operations. In various embodiments of the invention, the user may be able to select which mode the handheld device is to operate in (and therefore which area of his/her life it is directed to), and the device will apply the appropriate restrictions and access the appropriate databases and applications for that area. This characteristic is referred to herein as "context awareness". Context awareness may begin by noting which of the three modes the device is operating in, but may be expanded to include other internal operational indicators as well.

The handheld device may also automatically adjust its operation based on the environment that it senses. For example, the device might automatically trigger the work mode by sensing the wireless router used at work, by inferring the user is at work from the time of day and day of the week, by determining its location through a GPS sensor, or through other techniques of location awareness. Of course, these modes could also be manually overridden by the user as appropriate. In a similar manner, the device may stay in the same mode, but perform differently based on sensing its environment. For example, if it senses it is moving at typical automobile speeds, it may provide traffic information, weather information, data on nearby restaurants, etc. This characteristic of changing its operation based on sensing the surrounding environment is referred to herein as "situational awareness". Context awareness and situational awareness may both be used by the device to alter its operation, either separately or in cooperation with each other.

Various embodiments of the invention relate to a multi-function handheld user device that may have multiple selectable modes of operation for different areas of the user's life, each mode with its own database, applications, preferences, operational restrictions, and access limitations. Various mechanisms may be provided for switching between modes.

Figure 1:
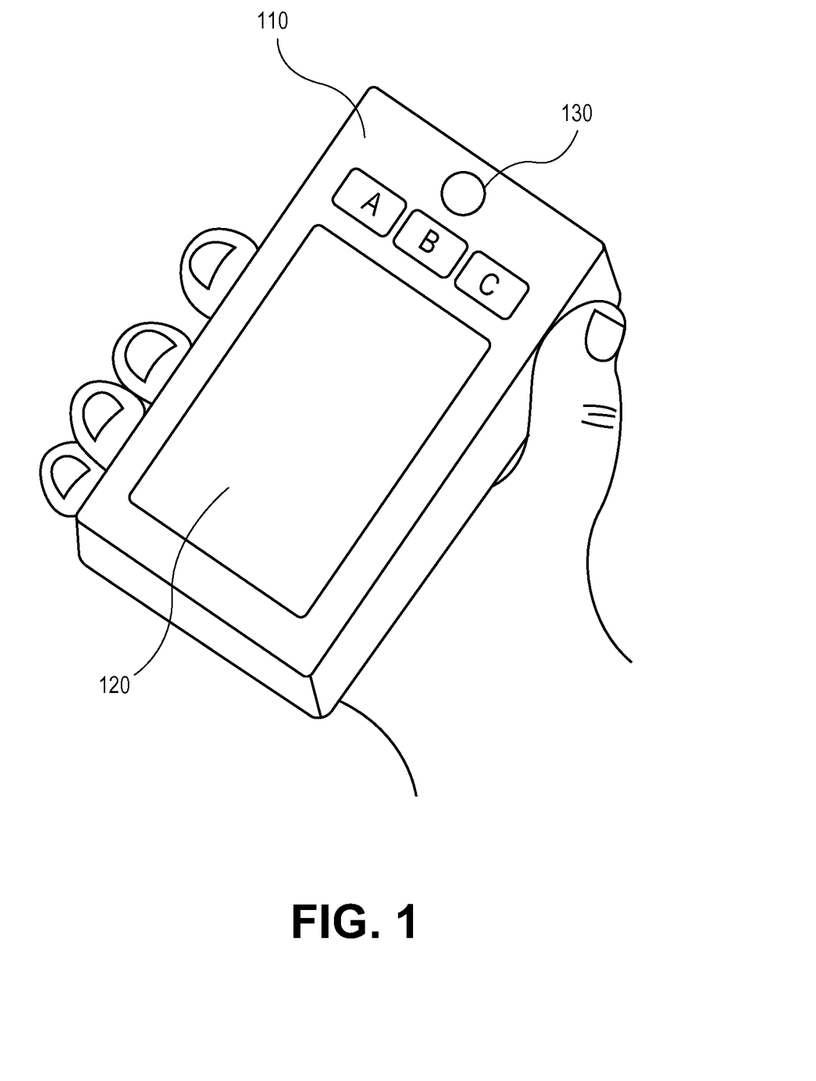
FIG. 1 shows a multi-function handheld user device, according to an embodiment of the invention.

FIG. 1 shows a multi-function handheld user device, according to an embodiment of the invention. The illustrated device 110 is shown with various components, such as a touchscreen (a touch-sensitive display screen) 120 and buttons A, B, and C. Another input/output function 130 is also shown which, depending on the embodiments, may provide various types of functionality, such as but not limited to: 1) another button, 2) a camera lens, 3) a microphone, 4) etc. Other buttons, sensors, output devices, etc. may also be included but are not shown to avoid excessive clutter in the drawing.

The illustrated buttons are called 'hard' buttons because they are physical buttons, located in specific areas. But in some embodiments, 'soft' buttons may be used, each consisting of an image on the touch-sensitive display screen. The soft button may be activated by touching the image. In some situations, these soft buttons may also be used for mode selection. Their graphic image and their position on the screen, as well as whether they even show up on the screen, may be programmably variable. Various soft buttons may have the same or different functionality as hard buttons.

Although the illustrated device 110 is depicted as having a particular shape, proportion, and appearance, with buttons located in particular locations, this is for example only and the embodiments of the invention may not be limited to this particular physical configuration. For example, in some embodiments the buttons may have different sizes and/or different shapes than shown, be located elsewhere on the same side or on different sides of the device, etc. They may also come in different colors. In some embodiments the overall shape of the device 110 may be different than shown.

Device 110 may also include functionality for wireless communication, for various visual, audio, and physical inputs, and for various visual, audio, and physical outputs. In some embodiments, the device may use this functionality in different ways depending on which mode it is in, and/or depending on which situation and context it senses.

Multimode Operation

The various modes may be created in the same device through various techniques that provide sufficient isolation and restricted access to keep the modes operationally separate. As previously mentioned, the device may operate somewhat differently depending on which mode it is operating in.

FIGS. 2A-2D show how the different modes may have access to different data, functionality, and features, according to various embodiments of the invention. The three modes are labeled as Work, Family, and Personal, but these are just an example. Any other labels could be used, and the usage of the different modes may be different than that described. However, the basic concept should be evident from these examples.

Figure 2A:
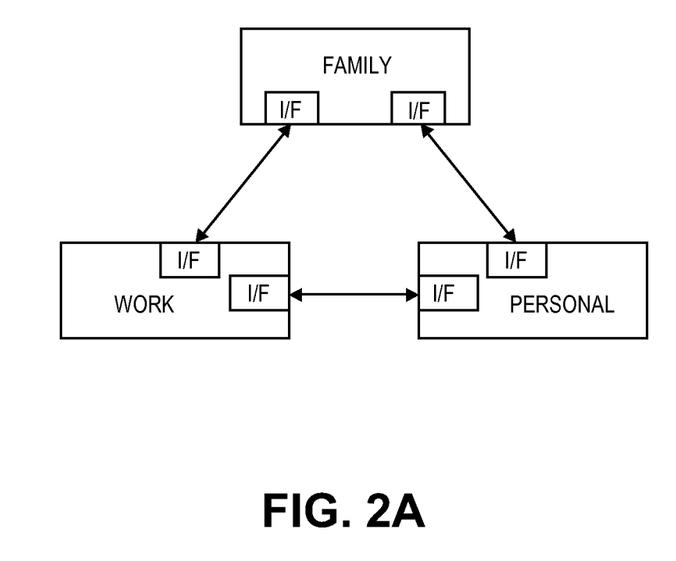
FIGS. 2A-2D show how the different modes may have access to different data, functionality, and features, according to various embodiments of the invention.

For example, FIG. 2A shows an approach that implements each mode as a separate virtual machine. In this technique, multiple virtual machines may operate in isolation within a single physical machine. Each virtual machine, implemented in software, does not know of the existence of any other virtual machine in this device and therefore does not knowingly share any resources (e.g., data, software, hardware, etc.) with another machine. If the different virtual machines must communicate with each other, they do so through virtual interfaces, much as separate physical machines would communicate through a network connection, except that the interfaces may be tied to each other through software within device 110 rather than through external physical connections. Whether the different virtual machines actually share portions of memory or other resources may be irrelevant, since they have no capacity to know of this sharing.

Figure 2B:
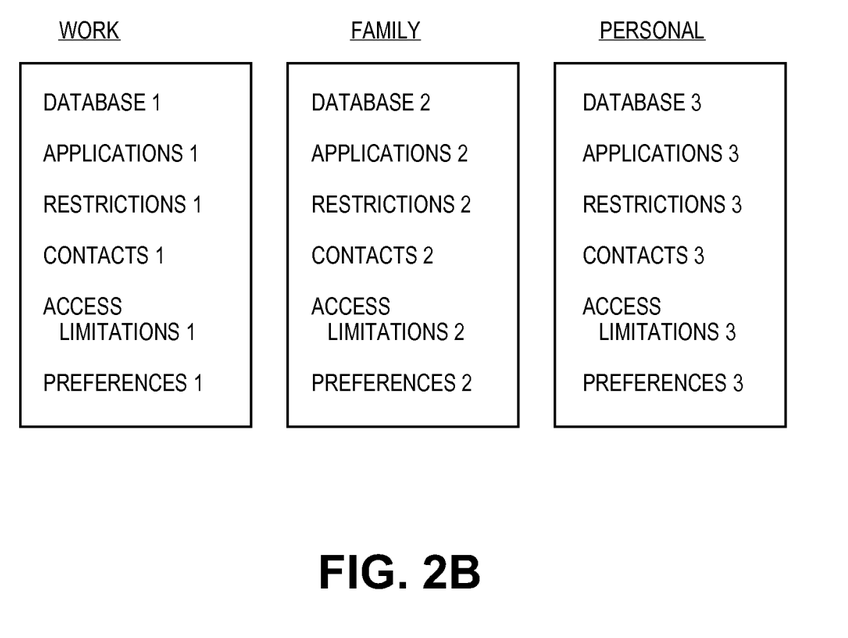
Figure 2C:
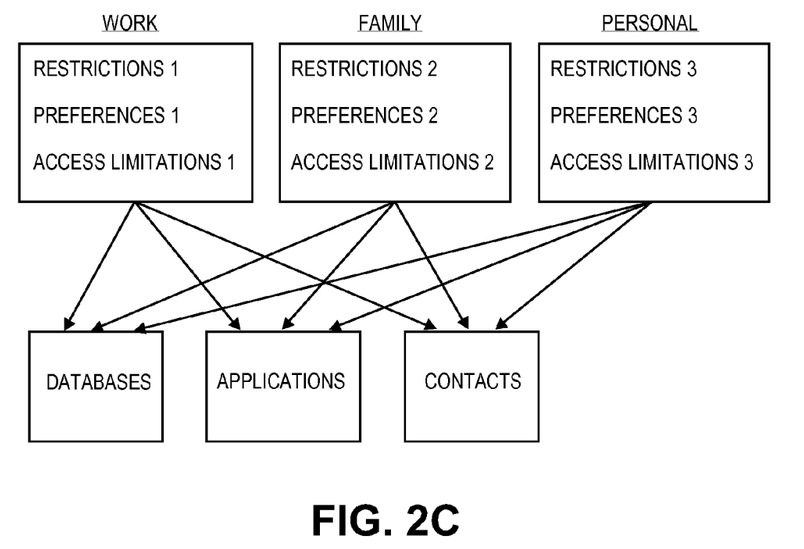
Figure 2D:
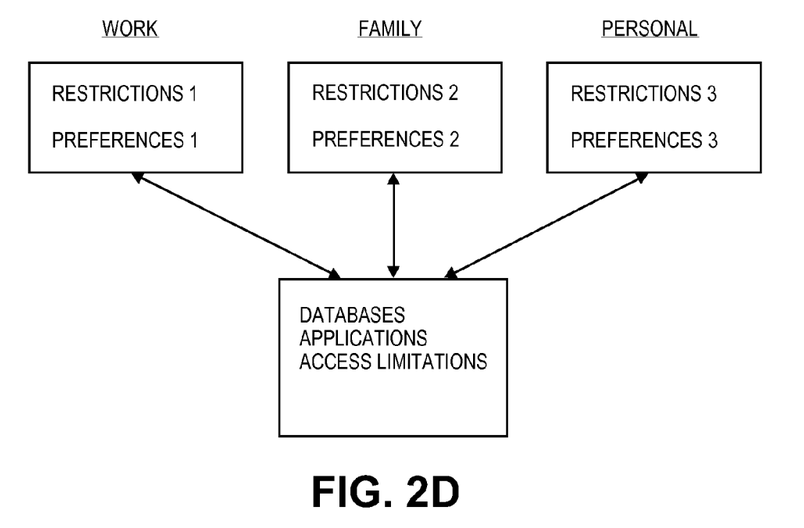

FIGS. 2B-2D show various approaches in which the necessary information and data is separated in different ways with or without the use of virtual machines. In some embodiments, each block shown in FIGS. 2B-2D may be assumed to be a separately defined portion of memory, (physical and/or virtual memory) that is dedicated to that mode of operation, but other embodiments may use other techniques to separate these entities. In some embodiments, a distinction is made between operational memory (e.g., RAM memory in which the applications are executed) and storage memory (e.g., flash memory in which the applications and data are stored for future access), and each type of memory may be treated separately for each type of content. Within this document, 'access limitations' refers to limitations on which data, application programs, devices, addresses, etc., may be accessed while in a particular mode. 'Operational restrictions' refers to restrictions on what operations a device may perform while in a particular mode. Obviously there are some instances in which a particular resource may fall into either category, (for example, if a spreadsheet function cannot be performed in a particular mode, it might be because the device cannot access the spreadsheet application, or it might be because the device can access the spreadsheet application but is not allowed to enter data into it). This possible overlap does not detract from either definition, it merely recognizes that some things may fall into either category depending on how they are implemented.

In FIG. 2B, each mode may be assumed to operate using a different database, and run different sets of applications. Each mode may also have its own operational restrictions, its own list of contacts, its own access limitations, its own list of user preferences, and its own set of other things not listed here. In the configuration shown in FIG. 2B, it is implied that each database is separate from the other two databases, even though they may contain duplicate copies of some of the same data. Likewise, it is implied that each mode has is own copy of the applications software, even though the same application might be used in multiple modes. The other items listed for each mode are likewise shown as being separate and isolated from similar items in the other modes. This may be implemented, for example, by dedicating a portion of memory to each mode, and having all the relevant data, applications software, limitations, restrictions, etc., for each mode contained only in the memory dedicated to that mode. While this approach maintains strict separation, it may make inefficient use of the available operational and storage memory. Although this approach may encompass the virtual machine approach of FIG. 2A, it may also be implemented without the use of virtual machines.

FIG. 2C shows another approach, in which all data is kept in a common set of databases, but each mode's access limitations restrict which databases, or portions of a database, the device may access while in that mode. There may therefore be no need to keep separate copies of data that is common to multiple modes. Similarly, a single copy of every application may be maintained in storage memory, but each application may only be accessible to a particular mode if that mode's access limitations permit it. This approach may be extended to external access as well (e.g., contact information for a person or a website may be kept in a single place, but the ability to contact that person or website may be limited by each mode's access limitations). Conversely, it may be preferable to maintain separate copies of some things within each mode, such as user preferences or some operational restrictions (e.g., permissible language in an email). Any of the listed items of FIG. 2C may either be maintained separately for each mode, or maintained in a common pool available to whichever modes are authorized to access it, depending on which approach is deemed preferable in a given embodiment.

FIG. 2D shows an approach with a fourth mode (labeled as a shared mode) that provides overall control for the other three modes. In this approach the fourth mode, which may not be visible to the user, maintains control over the data, applications, limitations, etc, for each of the other modes. User preferences and/or operational restrictions for the first three modes may be maintained by each of those modes (as shown), or may also be under control of the fourth mode. In some embodiments the fourth mode also controls the transfer of data between the other modes. While the modes of FIGS. 2A-2C may each maintain a list of some of the limitations and restrictions they operate under, the fourth mode may keep such lists for the other modes, may handle requests for those resources from the other modes, and may grant or reject such requests. The fourth mode may also change the flags, indicators, lists, etc. as necessary to modify which modes have access to which resources. This approach may simplify the maintenance of what each mode can do, by keeping all that information in one place.

Regardless of which approach is used, the pointers, indexes, and other functional indicators that define access limitations and operational restrictions for each mode may be stored in a secure and compartmentalized manner, so that they can be accessed and/or changed only from the appropriate mode. This information may be stored at the operating system level, or in some embodiments in hardware (e.g., a SIM card or an embedded flash memory). As long as a single user is controlling all modes, and keeping the operations of each mode separate according to that user's wishes, normal security protections may not be necessary to keep the access privileges of one mode from intruding into another mode in an illicit manner. However, if multiple users have access to the device, security protections may be implemented as needed (e.g., entry into the Work mode may be restricted with a password or other security feature).

Mode Selection

Returning to FIG. 1, buttons A, B and C may be used to select the different modes the device will operate in. For example, if the user decides to assign these modes to his Work, Family, and Personal life, he might assign button A to select Work mode, button B to select Family mode, and button C to select Personal mode. Pressing a particular button may then cause the assigned mode to become active. In some embodiments, text on the display under each button may indicate which mode is assigned to that button, and thereby allow each user to customize those labels.

Not only may these buttons be used to simply select a mode, but various button-pressing conventions may allow the user to expand the functionality of these buttons to indicate where within a given mode the operations will begin, and in some cases whether a multi-mode operation will be enabled. This expanded functionality may be based on such things as the duration of the press, the number of times a button is pressed, the number of buttons pressed simultaneously, the sequence of pressing buttons, etc. For example, the following conventions might be used:

1) If the device is already in an operating state, a single press of a single button may switch the device to the mode assigned to that button. This function may be implemented through either hard or soft buttons.

2) If the device is in a sleep state, a short press of a single hard button may awake the device in the corresponding mode at the most recently visited location within the menu structure.

3) If the device is in a sleep state, a long press of a single hard button may awake the device at the home page of the corresponding mode.

4) From either an operating or sleep state, a rapid double press of the same button may place the device in a split screen view within the corresponding mode.

5) From either an operating or sleep state, concurrently pressing two of the hard buttons may place the device in a dual mode, in which the user may interact with both modes from the same screen.

6) A short press followed by a long press of the same button may call up a more complex set of soft buttons for that mode, allowing the user more choices than are feasible with only three hard buttons.

These are only a few of the possible button pressing conventions that may be used to select a mode, a starting location within that mode, and in some instances multi-mode operation. Other conventions may also be used.

Figure 3:
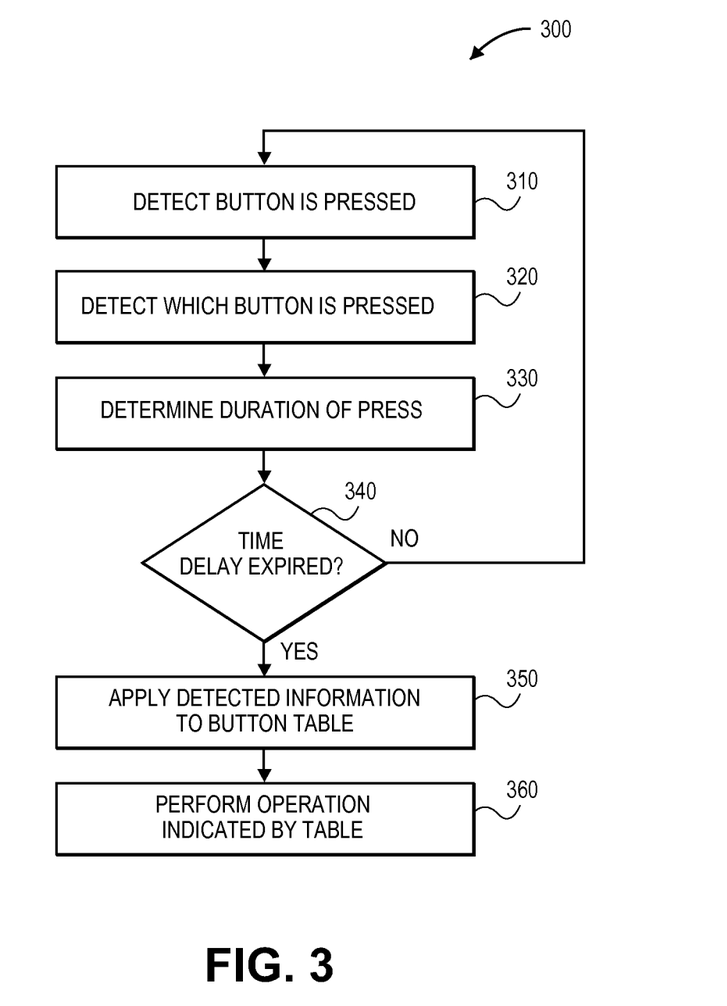
FIG. 3 shows a flow diagram of a method of converting button presses into various operations, according to an embodiment of the device.

FIG. 3 shows a flow diagram of a method of converting button presses into various operations, according to an embodiment of the device. The method of flow diagram 300 is general purpose in nature, describing only how the button presses are used to determine what action to take. The specific action that results from particular button inputs can vary widely depending on the specific design constraints built into the device. In some embodiments these design constraints are hard-wired into the device. In some embodiments these constraints may be programmable. In some embodiments these constraints may be changed by the user. In various embodiments, the button press conventions may be based on one or more of the following:

a) which button is pressed, b) whether multiple buttons are pressed at the same time, c) whether it is a single press or a sequence of multiple presses, and d) the duration of each press.

The process may begin at 310 when the device detects that a button has been pressed, and which button was pressed is detected at 320. These operations may also detect if more than one button is pressed simultaneously. In some embodiments, the duration of the press (i.e., how long the button is pressed) is determined at 330. In particular, a long or short press may be distinguished, with a long press exceeding a predetermined length of time before the button is released, and a short press not exceeding that predetermined length of time. In some embodiments this button-press information may be recorded using instructions performed by a microprocessor, but in other embodiments a state machine or other hardware design may maintain the information until the button pressing sequence is over.

After the button is released, a timer may be started to see if another button is to be pressed as a part of this sequence. If another button is pressed before the timer expires at 340, the operations of 310-320-330 may be repeated, and this information retained along with the information from the previous button press. If the time expires, it may be assumed that the button-press operation has been completed, and the device may then determine which action is to be taken as a result. In some embodiments, the device may refer to a table that converts button-press operations into related actions, as described at 350. Other embodiments may use other techniques. Once the indicated operation has been determined, that operation may be performed by the device at 360. Such operations may include, but are not limited to: a) going to the top-level starting point of the indicated mode, b) going to a point of the indicated mode that the device was at when that mode was last exited, c) going into a dual-mode operation, d) going into a low-power operation to reduce battery consumption, e) etc.

Cross-Mode Communications

In most cases, a separation of the available data, contacts, security, etc. between the different modes is highly desirable, even if some of the content of those things is duplicated between modes. But in some instances, it may be desirable to enter the same data, limitations, restrictions, etc. into more than one mode at the same time, or to move such information from one mode to another. In one type of operation, the user may make simultaneous entries into the two modes. In another type of operation, the user may transfer information between the two modes using a drag-and-drop or cut-and-paste operation.

Permission checks may be used to prohibit certain flows of information. For example, the user may be allowed to cut-and-paste information from Work mode to Personal mode, but not from Personal mode to Work mode. In another example, a document may be allowed to be transferred from Personal mode to Work mode, but not allowed to be used in Work mode until it has been screened for language inappropriate in the workplace. In still another example, it may be possible to enter contact information for a customer into the Work mode database, but the same information may be prohibited from being simultaneously entered into the Family mode database. In any transfer between modes, the transfer may be logged for historical or security audit reasons.

The actual mechanism used to transfer the data or software internally may depend on the structure used to keep the modes separate. For example, in the approach of FIG. 2D, the fourth mode may simply modify the relevant restrictions for the receiving mode concerning the now-shared information that was already in the fourth mode's database. In the approach of FIG. 2A or 2B, the receiving mode may store the received information and update its own list of restrictions/permissions as needed. Other techniques may also be used as appropriate.

Figure 4:
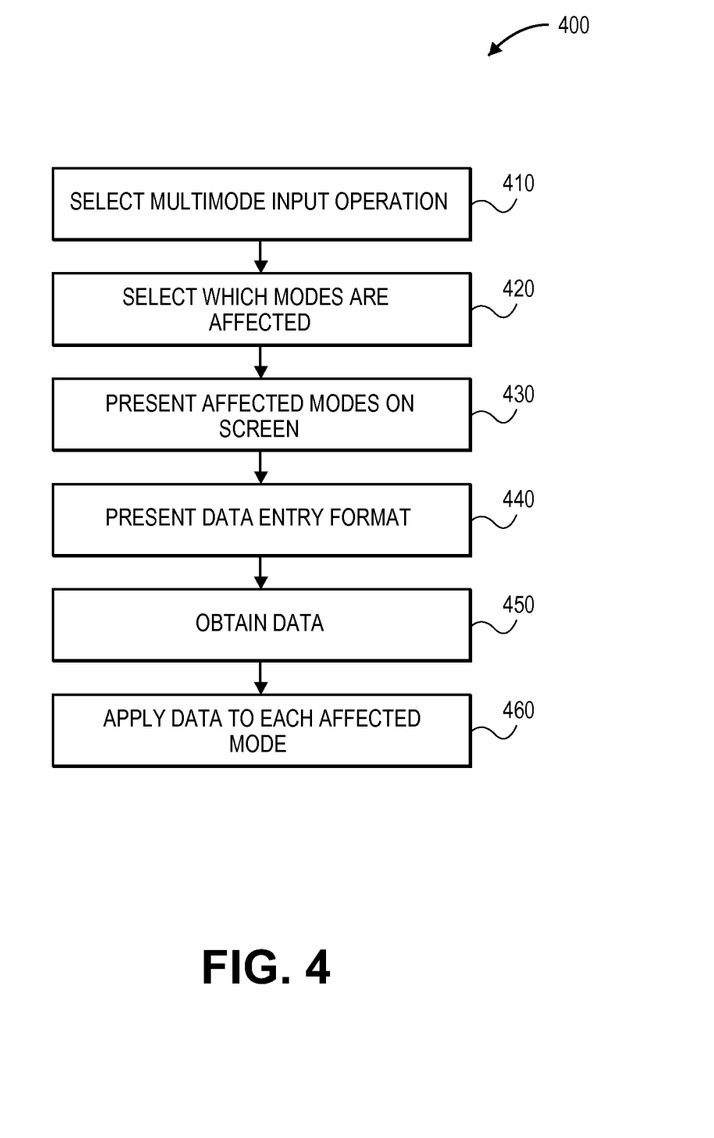
FIG. 4 shows a flow diagram of a method of inputting data for multiple modes of operation, according to an embodiment of the invention.

FIG. 4 shows a flow diagram of a method of inputting data for multiple modes of operation, according to an embodiment of the invention. In flow diagram 400, at 410 the device is placed into a multimode state for data entry, with the particular modes selected at 420. This selection may occur through any feasible means, such as the user pressing a certain combination and/or sequence of buttons, or through some more automated technique. At 430, the selected modes may be displayed on the screen to affirm to the user which modes are so selected.

At 440, the device may present a format on the screen that is suitable for the type of data to be entered. For example, a scheduling format may be displayed to enter calendar events, or a contact information format may be displayed to enter the email address for a person. This may be new information, or may be a change to existing information. When the data has been entered at 450, the device may apply that data to the databases for all of the selected modes at 460. The exact method of applying that information may depend on the structure used to keep the modes separate.

Figure 5:
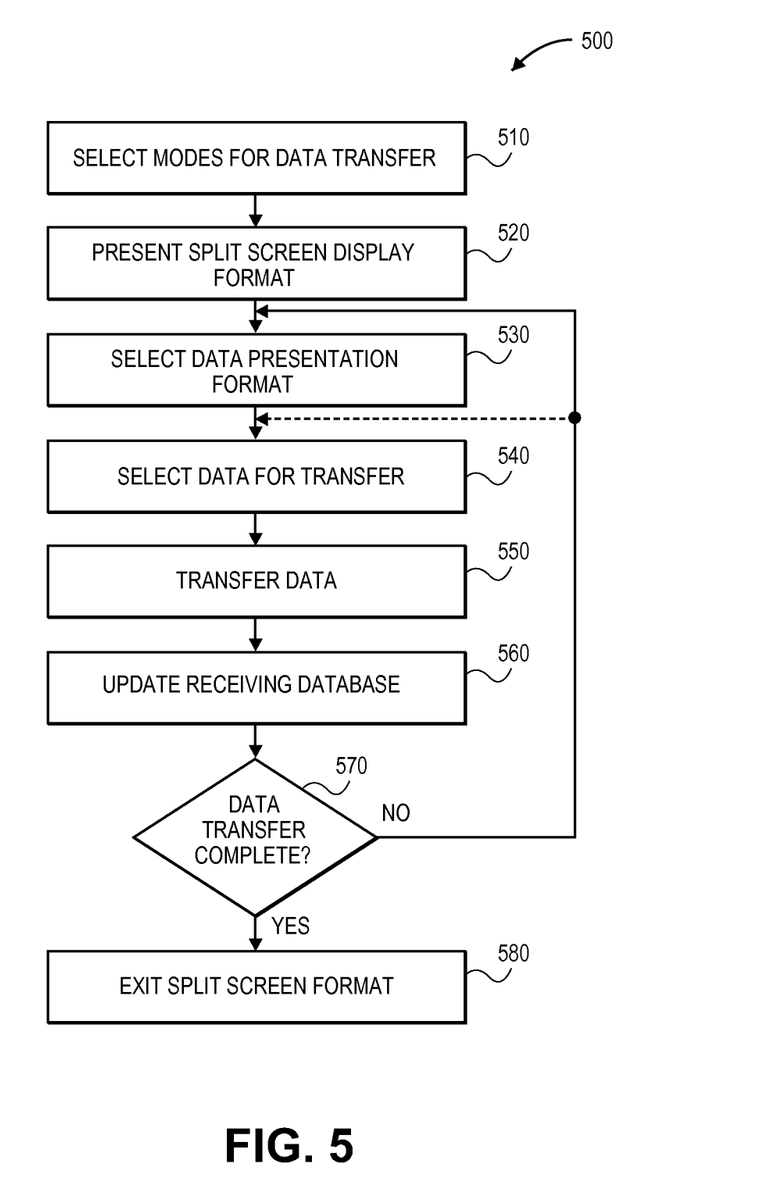
FIG. 5 shows a flow diagram of a method of transferring data between modes, according to an embodiment of the invention.

FIG. 5 shows a flow diagram of a method of transferring data between modes, according to an embodiment of the invention. In flow diagram 500, at 510 the user selects the two modes to be used in the data transfer, and the device presents the split screen display format at 520. In some embodiments, 510 and 520 may be handled simultaneously, for example by using a particular button-press convention to select which modes will be involved in the split screen data transfer operation.

Different types of display formats are better suited for different types of data. When the user selects the type of data to be transferred, this may automatically select the best format for presenting that type of data at 530. Alternately, the user may select the type of display format at 530 (e.g., a spreadsheet) and then call up the particular data into that format. In either case, the selected format for one side of the split screen may be duplicated in the other side of the split screen. At 540, when the user selects the data to be transferred on one side of the screen, the data may by copied onto the corresponding parts of the other side of the screen. This transfer may be initiated through any feasible means, such as a drag-and-drop, a cut-and-paste, or other technique.

Once the data has been transferred, the user may initiate a data save function at 560 to update the database for the receiving mode. Depending on the mechanism used for accessing common data, this may involve storing a copy of the data in the receiving mode, or may simply involve updating pointers to a database shared with the originating mode.

If there is more data to be transferred, as determined at 570, the flow may return to 530 (if the new data transfer requires a different presentation format), or to 540 (if the presentation format will be the same). Once all data has been transferred between these two modes, the process may exit at 580. In some embodiments, different data may be transferred in opposite directions from the same split screen format, simply by designating data on one side of the split screen as the originating data, moving it to the other side, then doing the same thing in the opposite direction for other data.

Context Awareness

Context awareness is based on user activity. As a starting point, context awareness may note which of the three modes the user is operating in, and provide or prevent various functionality based on that mode. Alternatively, if the user is trying to perform activities that are only available in another mode, it may inform the user of that conflict. But context awareness may also extend well beyond these simple interpretations.

The key to context awareness is that the device notes what device activity (or activities, or sequence of activities) the user is currently performing, determines what other activities the user might want to perform based on past activity of the user and/or based a database of typical human behavior, and then automatically begins searching for, and providing information on, those other activities. For example, if the user requests a listing of current movies, the device may automatically begin searching for local movie theaters, a list of movies and show times available in each theater for that day, and a list of movie reviews for each of the available movies. If the user inquires about the status of the device's battery, the device may present not only current battery charge, but also an estimate of remaining battery life for each of several different operations that the user frequently performs. In another example, if the user requests an on-line bank statement to determine his current account balance, the device may also analyze previous account history to determine when the next pay check is due for automatic deposit, which reoccurring bills will be due before than date, how much money the user will have for discretionary spending based on that analysis, and a history of previous discretionary spending.

In each case, the device responds not only to what the user requests, but also makes some assumptions about what other information might be helpful to the user that was not specifically requested, and automatically attempts to obtain that other information. The device may then present this other information to the user and/or the device may take a particular action, although the user did not specifically request either the information or the action, and this other information was not necessary for responding to the user's request.

Situational Awareness

Situational awareness is based on the external environment surrounding the device. The device may obtain information on its environment through several mechanisms, such as but not limited to: 1) a GPS system to determine its physical location, 2) one or more radio systems to determine what wireless networks or wireless devices are within communication range, 3) an image recognition system that analyses camera inputs, 4) an audio recognition system that recognizes microphone inputs, 5) sensors (e.g., accelerometers) to determine movement and/or orientation of the device, 6) temperature sensors, 7) etc. One or more of these sensory inputs may be used in connection with one or more databases (internal or external) to derive even more information on the surrounding environment.

For example, from its GPS system and a digitized map, the device may determine it is located at a particular point and moving down a road at highway speeds. The device's accelerometers may then sense a sudden, high-impact force, followed by a lack of movement and a static image from the device's camera. From this information, the device may determine that an automobile crash has occurred. After audibly prompting the user and failing to receive a reply, the device may determine which cell phone tower it is currently associated with, and call 911 with an automated distress call that identifies where the vehicle is located.

In another example, the device may sense wireless traffic from a server at the user's place of employment and thereby determine that the user is at work. The device may then automatically switch to work mode.

In still another example, a user may drive to a favorite coffee shop, only to learn that the shop is closed. To learn the location of another coffee shop, the user may use the device's camera to take a picture of the coffee shop's logo, and request the location of the nearest alternative. The device may then:

a) Use image processing to determine the brand name of that chain of coffee shops.
  b) Determine the user's location from the GPS system.
  c) Wirelessly request and receive a list of the locations of other coffee shops in the area, along with their scheduled hours of operation.
  d) Depending on the user's desired level of automation, the device may select a coffee shop from the list, or prompt the user to select a one.
  e) Provide travel directions to get to the selected coffee shop. The directions may be interactive, changing as the user travels to the desired destination.

In each case, the device monitors for environmental information. When the user requests information, the device responds not only to what the user requests, but also makes some assumptions about what other information might be helpful to the user that was not specifically requested, and automatically attempts to obtain that other information based on the environmental monitoring. The device may then present this other information to the user and/or the device may take a particular action, although the user did not specifically request the information or the action.

Combined Context and Situational Awareness

Figure 6:
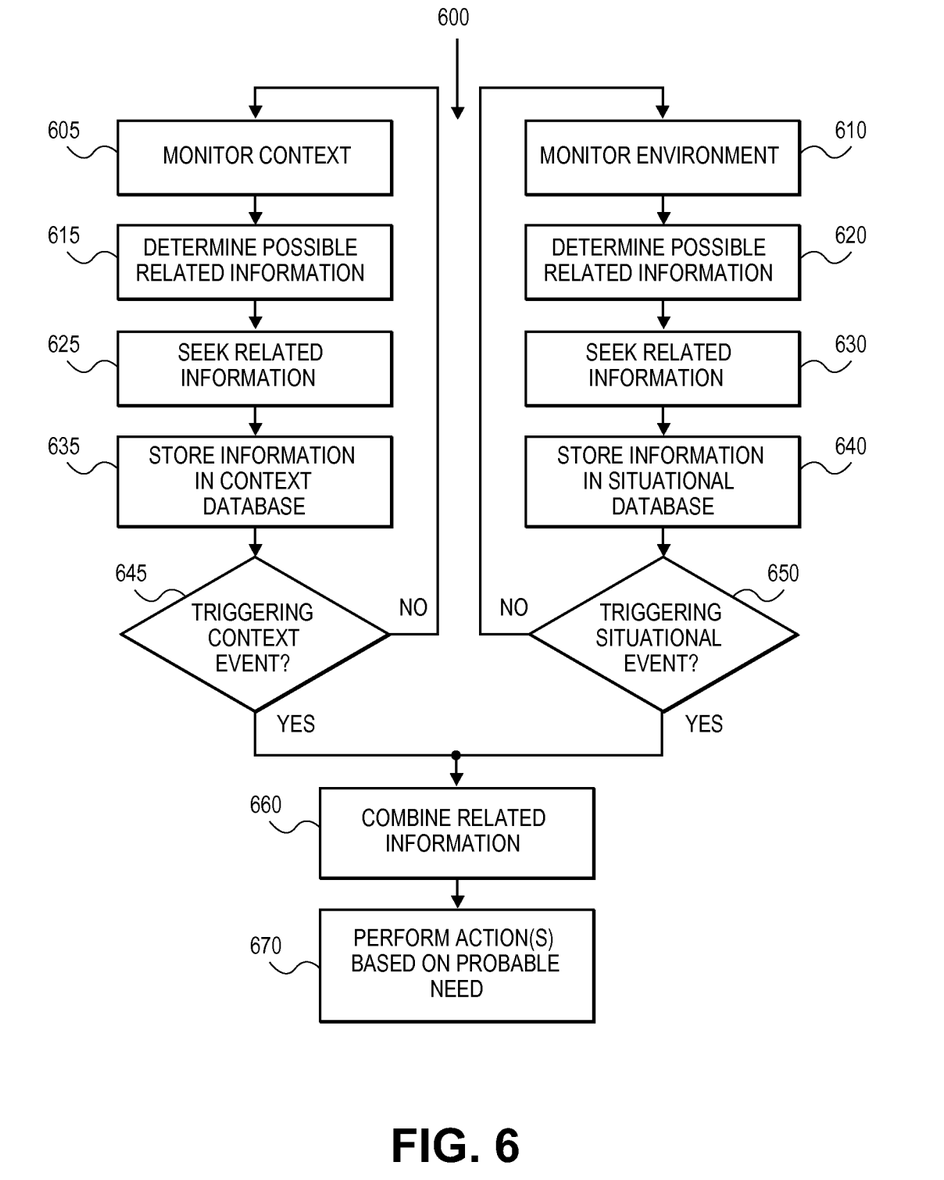
FIG. 6 shows a flow diagram of a method of using both Context Awareness and Situational Awareness to trigger an action, according to an embodiment of the invention.

FIG. 6 shows a flow diagram of a method of using both Context Awareness and Situational Awareness to trigger an action, according to an embodiment of the invention. In the illustrated flow diagram 600, the context of the device is repeatedly monitored at 605 to keep track of the mode and the operations that the user is performing within that mode. As the context is monitored, the device determines at 615 whether there might be related information that could be useful based on the current context. If so, the device seeks that information at 625. This related information might be contained in the devices' own database, or might have to be obtained from external sources. Once obtained, this related information may be stored in the device's database at 635. This stored information may or may not have current use, but can be stored in case it becomes useful.

Concurrently, the environmental sensors may be used to repeatedly monitor the device's environment at 610. As the environment is monitored, the device determines at 620 whether there might be related information that could be useful based on the current environment. If so, the device seeks that information at 630. This related information might be contained in the devices' own database, or might have to be obtained from external sources. Once obtained, this related information may be stored in the device's database at 640. This stored information may or may not have current use, but can be stored in case it becomes useful.

The process loops at 605-615-625-635 and 610-620-630-640 may continue until a triggering event occurs at 645 or 650. A triggering event may be any of various types of events in which the user requests information, the device initiates an action, an alarm is detected, etc. Based on the triggering event, at 660 the device may combine and/or correlate various context and situational information that has been collected. Some of this information may have been collected as a result of continual monitoring, and some of this information may have been collected in response to a user request or device action. After combining/correlating the various information, the device may take an action at 670 based on this information. A common action would be to present the information to the user, but the device might initiate another operation not directly involving the user. It is important to note that that the information collected and presented to the user in this series of operations is not limited to the specific information requested by the user, nor is it limited to information that is necessary to fulfill the user's request for information. It includes information that was not requested, but there is a probability that the information will be useful based on the information that was requested by the user and based on various implied, inferred, or learned relationships between the requested and non-requested information. These relationships may be based on the user's past history, on the user's recorded preferences, on generally accepted behavioral norms, on common human activities, or on other similar factors.

In many instances, both context awareness and situational awareness may be used together to trigger automated operation in the device. By sensing the external environment, and combining that information with the context of current operations in the device, the device may initiate other operations that were not requested by the user, but are based on assumptions derived from the environmental inputs and the current context.

The foregoing description is intended to be illustrative and not limiting. Variations will occur to those of skill in the art. Those variations are intended to be included in the various embodiments of the invention, which are limited only by the scope of the following claims.

What is claimed is:

1. A handheld electronic device, comprising:
a touchscreen and a radio, the device to operate in any of multiple operational modes;
wherein each operational mode has a database and applications on the device that are separate and different from the database and applications of the other operational modes;
wherein each operational mode has access limitations and operational restrictions that are separate and different from the access limitations and operational restrictions of each of the other operational modes, and wherein the device further includes a shared mode that provides control over the multiple operational modes of the device;
wherein each operational mode pertains to a different segment of activities of a user of the device;
wherein the device provides for cross-mode communication of information between selected operational modes of the device in response to a selection of the operational modes for the cross-mode communication by the user of the device, the device including permission checks by the shared mode based on at least the access limitations and the operational limitations for each of the selected operational modes to allow or prohibit certain flows of information between the selected operational modes, the cross-mode communication between the selected operations modes including one of:
placing the device into a multimode state for data entry simultaneously in each of the operational modes selected by the user of the device, or
the shared mode transferring data between the operational modes selected by the user of the device.

2. The device of claim 1, wherein each operational mode has separate restrictions on what external devices are accessible to the device through wireless communications.

3. The device of claim 1, wherein each operational mode has separate restrictions on what terminology is permissible in documents generated within the operational mode.

4. The device of claim 1, wherein each operational mode has a separate list of email contacts that are accessible while operating in that operational mode.

5. The device of claim 1, wherein the operational modes are selectable by the user based on pressing at least one of multiple soft buttons on the device.

6. The device of claim 1, wherein the operational modes are selectable by the user based on touching at least one of multiple hard buttons on the device.

7. The device of claim 6, wherein the device is to interpret a button pressing sequence of the multiple buttons, the interpretation to determine which button is pressed and at least one other factor selected from a list consisting of:
a) whether the duration of the press exceeds a particular time limit;
b) whether the button is pressed multiple times; and
c) whether multiple buttons are pressed simultaneously.

8. The device of claim 1, wherein the device is to use context awareness and situational awareness to operate in each operational mode.

9. The device of claim 1, wherein the device has multiple buttons to select which operational mode to enter and at what point within that operational mode to begin.

10. The device of claim 1, wherein the device is to display the selected operational modes for the multimode state on the touchscreen for data entry in the selected operation modes simultaneously.

11. The device of claim 1, wherein the device is to display a split screen for transfer between the selected operational modes.

12. The device of claim 1, wherein the shared mode maintains lists of the access limitations and operational limitations for the multiple operational modes.

13. The device of claim 12, wherein the shared mode is not visible to a user of the device.

14. The device of claim 1, wherein each operational mode of the multiple operational modes is implemented by a separate virtual machine.

15. The device of claim 14, wherein the virtual machine of each operational mode is unaware of the existence of the virtual machines of the other operational modes.

16. A method, comprising:
switching a handheld electronic device from one operational mode to another operational mode of multiple operational modes, a shared mode of the device providing control over the operational modes; and
providing cross-mode communication of information between selected operational modes in response to a selection of the operational modes for the cross-mode communication by a user of the device, including applying permission checks by the shared mode to allow or prohibit certain flows of information between the selected operational modes, the cross-mode communication including one of:
placing the device into a multimode state for data entry simultaneously in each of the operational modes selected by the user of the device, or
the shared mode transferring data between the operational modes selected by the user of the device;
wherein each mode has a database, applications, access limitations, and operational restrictions that are separate and different from the database, applications, access limitations, and operational restrictions of each of the other operational modes, and wherein the permission checks include the shared mode applying the access limitations and operational restrictions for each of the selected operational modes.

17. The method of claim 16, wherein said switching is performed in response to detecting pressing of at least one of multiple hard buttons on the device that are designated for operational mode switching.

18. The method of claim 17, wherein said switching comprises:
detecting that a first of the multiple buttons on the device is pressed;
determining that at least one criteria is met, the criteria selected from a list consisting of:
a) detecting pressing of a second button concurrently with the first button;
b) detecting pressing of the first button multiple times; and
c) detecting pressing of the first button for longer than a predetermined duration;
and
entering at least one of the operational modes associated with the first button, based on said detecting and said determining.

19. The method of claim 18, wherein the operation of entering is selected from a list consisting of:
a) entering an operational mode associated with the first button at an initial page in the operational mode;
b) entering an operational mode associated with the first button at a same page the device was at when the operational mode was last exited; and
c) entering a multimode operation permitting a user to access two of the operational modes from a same display on a touchscreen.

20. The method of claim 16, further comprising displaying the selected operational modes for the multimode state on the touchscreen of the device for data entry in the selected operation modes simultaneously.

21. The method of claim 16, further comprising displaying a split screen for transfer between the selected operational modes.

22. An article comprising a non-transitory computer-readable storage medium that contains instructions that when executed by one or more processors result in performing operations comprising:
switching a handheld electronic device from one operational mode to another operational mode of multiple operational modes, a shared mode of the device providing control over the operational modes; and
providing cross-mode communication of information between selected operational modes in response to a selection of the operational modes for the cross-mode communication by a user of the device, including applying permission checks by the shared mode to allow or prohibit certain flows of information between the selected operational modes, the cross-mode communication including one of:
placing the device into a multimode state for data entry simultaneously in each of the operational modes selected by the user of the device, or
the shared mode transferring data between the operational modes selected by the user of the device;
wherein each mode has a database, applications, access limitations, and operational restrictions that are separate and different from the database, applications, access limitations, and operational restrictions of each of the other modes, and wherein the permission checks include the shared mode applying the access limitations and operational restrictions for each of the selected operational modes.

23. The article of claim 22, wherein the operation of switching is in response to detecting pressing of at least one of multiple hard buttons on the device that are designated for operational mode switching.

24. The article of claim 23, wherein the operation of switching comprises:
detecting that a first of the multiple buttons on the device is pressed;
determining that at least one criteria is met, the criteria selected from a list consisting of:
a) detecting pressing of a second button concurrently with the first button;
b) detecting pressing of the first button multiple times; and
c) detecting pressing of the first button for longer than a predetermined duration;
and
entering at least one of the operational modes, based on said detecting and said determining.

25. The article of claim 24, wherein the operation of entering is selected from a list consisting of:

a) entering an operational mode associated with the first button at an initial page in the operational mode;
b) entering an operational mode associated with the first button at a same page the device was at when the operational mode was last exited; and
c) entering a multimode operation permitting concurrent access to two of the operational modes from a same display on a touchscreen.

26. The article of claim 22, wherein each operational mode has separate restrictions on what external devices are accessible to the device through wireless communications.

27. The article of 22, wherein each operational mode has separate restrictions on what web sites are accessible to the device.

28. The article of claim 22, wherein each operational mode has a separate list of email contacts that are accessible while operating in that operational mode.

29. The article of claim 22, further comprising instructions that when executed by one or more processors result in performing operations comprising:
   displaying the selected operational modes for the multimode state on the touchscreen of the device for data entry in the selected operation modes simultaneously.

30. The article of claim 22, further comprising instructions that when executed by one or more processors result in performing operations comprising:
   displaying a split screen for transfer between the selected operational modes.

\* \* \* \* \*